United States Patent
Levy et al.

(10) Patent No.: US 11,336,399 B2
(45) Date of Patent: May 17, 2022

(54) CODE BLOCK REORDERING FOR RETRANSMISSIONS

(71) Applicant: QUALCOMM Incorporated, San Diego, CA (US)

(72) Inventors: Sharon Levy, Binyamina (IL); Ran Berliner, Kfar-Aviv (IL); Ory Eger, Tel Aviv (IL); Alexandros Manolakos, San Diego, CA (US); Gabi Sarkis, San Diego, CA (US); Gideon Shlomo Kutz, Ramat Hasharon (IL)

(73) Assignee: QUALCOMM INCORPORATED, San Diego, CA (US)

( * ) Notice: Subject to any disclaimer, the term of this patent is extended or adjusted under 35 U.S.C. 154(b) by 77 days.

(21) Appl. No.: 16/694,688

(22) Filed: Nov. 25, 2019

(65) Prior Publication Data
US 2021/0075554 A1 Mar. 11, 2021

(30) Foreign Application Priority Data
Sep. 9, 2019 (GR) .............................. 20190100386

(51) Int. Cl.
*H04L 1/18* (2006.01)
*H04W 76/11* (2018.01)
*H04L 27/26* (2006.01)

(52) U.S. Cl.
CPC ............ *H04L 1/1819* (2013.01); *H04L 1/189* (2013.01); *H04L 27/2607* (2013.01); *H04W 76/11* (2018.02)

(58) Field of Classification Search
None
See application file for complete search history.

(56) References Cited

U.S. PATENT DOCUMENTS

| 2018/0270022 A1* | 9/2018 | Sun ..................... H04L 1/0061 |
| 2018/0278368 A1* | 9/2018 | Kim ..................... H04L 1/1829 |
| 2019/0020444 A1* | 1/2019 | Froberg ................ H04L 1/1819 |
| (Continued) | | |

FOREIGN PATENT DOCUMENTS

| WO | 2017074537 A1 | 5/2017 |
| WO | 2019053631 A1 | 3/2019 |

OTHER PUBLICATIONS

Co-Pending U.S. Appl. No. 62/822,665, entitled "Methods for Retransmission for Improved Handling of Vulnerable Symbols", by Kapil Gulati, filed Mar. 22, 2019, 41 pages.
(Continued)

*Primary Examiner* — Marcus Smith
(74) *Attorney, Agent, or Firm* — Harrity & Harrity, LLP

(57) ABSTRACT

Various aspects of the present disclosure generally relate to wireless communication. In some aspects, a transmitter device may transmit a hybrid automatic repeat request (HARQ) communication using a first code block order for code blocks of the HARQ communication; detect a trigger to retransmit the HARQ communication based at least in part on transmitting the HARQ communication; reorder the code blocks of the HARQ communication based at least in part on detecting the trigger to retransmit the HARQ communication; and retransmit the HARQ communication using a second code block order based at least in part on reordering the code blocks of the HARQ communication. Numerous other aspects are provided.

30 Claims, 9 Drawing Sheets

(56) References Cited

U.S. PATENT DOCUMENTS

| | | | |
|---|---|---|---|
| 2019/0158230 A1* | 5/2019 | Chen | H04L 1/0057 |
| 2019/0207734 A1* | 7/2019 | Yang | H04L 1/1614 |
| 2020/0008216 A1* | 1/2020 | Iyer | H04W 72/04 |
| 2020/0220663 A1* | 7/2020 | Tsai | H04L 1/1864 |
| 2020/0295873 A1* | 9/2020 | Jayasinghe | H04L 1/1614 |
| 2020/0304246 A1* | 9/2020 | Ahn | H04W 76/19 |
| 2020/0389873 A1* | 12/2020 | Liu | H04L 1/0073 |

OTHER PUBLICATIONS

Intel Corporation: "Downlink Multiplexing of eMBB/URLLC Transmissions", 3GPP Draft, 3GPP TSG RAN1 WG Meeting #88, R1-1702240, INTEL—URLLC_EMBB_MUX_DL, 3rd Generation Partnership Project (3GPP), Mobile Competence Centre, 650, Route Des Lucioles, F-06921, Sophia-Antipolis Cedex, France, vol. RAN WG1. No. Athens. Greece; Feb. 13, 2017-Feb. 17, 2017, Feb. 12, 2017 (Feb. 12, 2017), XP051209398, 7 pages, Retrieved from the Internet:URL: http://www.3gpp.org/ftp/Meetings_3GPP_SYNC/RAN1/Docs/ [retrieved on Feb. 12, 2017] paragraph [0002] —paragraph [0003].

International Search Report and Written Opinion—PCT/US2019/063384—ISA/EPO—dated Jun. 2, 2020.

MCC Support: "Draft Report of 3GPP TSG RAN WG1 #50 v0.2.0 (Athens, Greece, Aug. 20-24, 2007)", 3GPP Draft, 3GPP TSG RAN WG1 Meeting #50b, R1-073896, 3rd Generation Partnership Project (3GPP), Mobile Competence Centre, 650, Route Des Lucioles, F-06921, Sophia-Antipolis Cedex, France, vol. RAN WG1. No, Shanghai, China; Oct. 8, 2007-Oct. 12, 2007, Jan. 29, 2008 (Jan. 29, 2008), XP050107449, 59 pages, [retrieved on Jan. 29, 2008] paragraph [7.2.2], paragraph [07.3].

* cited by examiner

CODE BLOCK REORDERING FOR RETRANSMISSIONS

CROSS-REFERENCE TO RELATED APPLICATION

This application claims priority to Greek Patent Application No. 20190100386, filed on Sep. 9, 2019, entitled "CODE BLOCK REORDERING FOR RETRANSMISSIONS," which is hereby expressly incorporated by reference herein.

TECHNICAL FIELD

Aspects of the technology described below generally relate to wireless communication and to techniques and apparatuses for code block reordering for retransmissions. Some techniques and apparatuses described herein enable and provide wireless communication devices and systems configured for hybrid automatic repeat request (HARD) feedback, high reliability communication, and improved average processing gain.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. A BS may be referred to as a Node B, a gNB, an access point (AP), a radio head, a transmit receive point (TRP), a new radio (NR) BS, a 5G Node B, and/or the like.

Multiple access technologies have been adopted in various telecommunication standards. Wireless communication standards provide common protocols to enable different devices (e.g., user equipment) to communicate on a municipal, national, regional, and even global level. New radio (NR), which may also be referred to as 5G, is a set of enhancements to the LTE mobile standard promulgated by the Third Generation Partnership Project (3GPP). As demand for mobile broadband access continues to increase, there exists a need for further improvements in LTE and NR technologies. These improvements can apply to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The purpose of the summary is to present some concepts of one or more aspects of the disclosure in summary form as a prelude to the more detailed description that is presented later.

Devices in a wireless communications network may use feedback messages to reduce a likelihood of dropped communications and may retransmit the feedback messages to achieve average processing gain. For example, a transmitter device may transmit a hybrid automatic repeat request (HARQ) communication and periodically retransmit the HARQ communication. The HARQ communication may increment a processing gain in a receiver device by applying chase combining (e.g., transmitting the same data in a plurality of transmissions) or by providing incremental redundancy (e.g., by transmitting different data in a plurality of transmissions). A time invariant impairment may occur for transmissions and retransmissions of HARQ communications.

The time invariant impairment may correspond to a particular time resource or a particular frequency resource within a slot in which the HARQ communication is transmitted. The time invariant impairment may recur at the particular time resource or the particular frequency resource in subsequent slots that include retransmissions of the HARQ communication. For example, during transmissions (and retransmissions) of HARQ communications, the time invariant impairment may result in degraded performance of a first subset of code blocks (e.g., for each transmission and retransmission of the HARQ communication) relative to a second subset of code blocks.

Examples of time invariant impairments and other impairments may include spurs, periodic interference, edge effects, residual frequency impairment, code block position-based impairment, and/or the like. A spur may be a frequency component that interferes with a signal as a result of electromagnetic interference from an electrical component, such as an electrical component of a transmitter device, a receiver device, or another device within a proximity of the transmitter device or receiver device. In the case of a spur, a set of code blocks that include a common frequency at which the spur occurs may experience reduced performance as a result of the spur.

As another example, for periodic interference, a set of code blocks that are disposed at a common time may experience interference from aggressor transmissions (e.g., a periodic channel state information reference signal (CSI-RS)) of the aggressor transmitter device. In this case, the common time may be at a symbol at which a periodic signal of an aggressor transmitter device occurs. As another example, for edge effects, code blocks at a frequency edge of a frequency allocation may experience reduced performance relative to other code blocks. The reduced performance may be a result of the frequency allocation being misaligned with a physical resource block bundle group (PRG) grid.

As another example, for residual frequency impairment, channel estimation may not reflect a common phase error. This may occur when a set of code blocks are associated with a single demodulation reference signal (DMRS) without a phase tracking reference signal (PTRS). This may result in code blocks at higher symbols having lower performance gain relative to code blocks at lower symbols. As another example, code blocks at a first symbol, of a slot, may experience lower signal quality than code blocks at subsequent symbols. This may be a result of power differentials between the slot and a last symbol of a previous slot (e.g., for uplink channel). Alternatively, this may be a result of automatic gain control (AGC) convergence (e.g., for downlink channels, such as in cellular vehicle-to-everything (CV2X) deployments). Alternatively, this may be a result of an error vector magnitude for a first symbol after a transition between uplink and downlink or between downlink and uplink.

Some aspects described herein improve HARQ processing gain by reordering code blocks for different transmissions of a HARQ communication. For example, a transmitter device may reorder one or more code blocks of a slot for one or more retransmissions of the HARQ communication to vary which code blocks of the HARQ communication experience impairments. In this way, the transmitter device may increase an average processing gain of a transport block size (TBS) of the HARQ communication. Moreover, the transmitter device may reduce a likelihood of dropped communications by increasing the average processing gain and varying the interference or impairment applied to each code block in each transmission. Further, the transmitter device may reduce a quantity of retransmissions that are performed to ensure the HARQ communication is received by the receiver device, thereby reducing a utilization of network resources.

In some aspects, a method of wireless communication, performed by a transmitter device, may include transmitting a hybrid automatic repeat request (HARQ) communication using a first code block order for code blocks of the HARQ communication; receiving, from a receiver device, feedback to perform code block reordering; determining to retransmit the HARQ communication based at least in part on the received feedback; reordering the code blocks of the HARQ communication based at least in part on detecting the trigger to retransmit the HARQ communication; and retransmitting the HARQ communication using a second code block order based at least in part on reordering the code blocks of the HARQ communication.

In some aspects, a transmitter device for wireless communication may include memory and one or more processors operatively coupled to the memory. The memory and the one or more processors may be configured to transmit a hybrid automatic repeat request (HARQ) communication using a first code block order for code blocks of the HARQ communication; receive, from a receiver device, feedback to perform code block reordering; determine to retransmit the HARQ communication based at least in part on the received feedback; reorder the code blocks of the HARQ communication based at least in part on detecting the trigger to retransmit the HARQ communication; and retransmit the HARQ communication using a second code block order based at least in part on reordering the code blocks of the HARQ communication.

In some aspects, a non-transitory computer-readable medium may store one or more instructions for wireless communication. The one or more instructions, when executed by one or more processors of a transmitter device, may cause the one or more processors to: transmit a hybrid automatic repeat request (HARQ) communication using a first code block order for code blocks of the HARQ communication; receive, from a receiver device, feedback to perform code block reordering; determine to retransmit the HARQ communication based at least in part on the received feedback; reorder the code blocks of the HARQ communication based at least in part on detecting the trigger to retransmit the HARQ communication; and retransmit the HARQ communication using a second code block order based at least in part on reordering the code blocks of the HARQ communication.

In some aspects, an apparatus for wireless communication may include means for transmitting a hybrid automatic repeat request (HARQ) communication using a first code block order for code blocks of the HARQ communication; means for receiving, from a receiver device, feedback to perform code block reordering; means for determining to retransmit the HARQ communication based at least in part on the received feedback; means for reordering the code blocks of the HARQ communication based at least in part on detecting the trigger to retransmit the HARQ communication; and means for retransmitting the HARQ communication using a second code block order based at least in part on reordering the code blocks of the HARQ communication.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description is provided herein, with some aspects of the disclosure being illustrated in the appended drawings. However, the appended drawings illustrate only some aspects of this disclosure and are therefore not to be considered limiting of the scope of the disclosure. The same reference numbers in different drawings may identify the same or similar elements.

DETAILED DESCRIPTION

Figure 1:
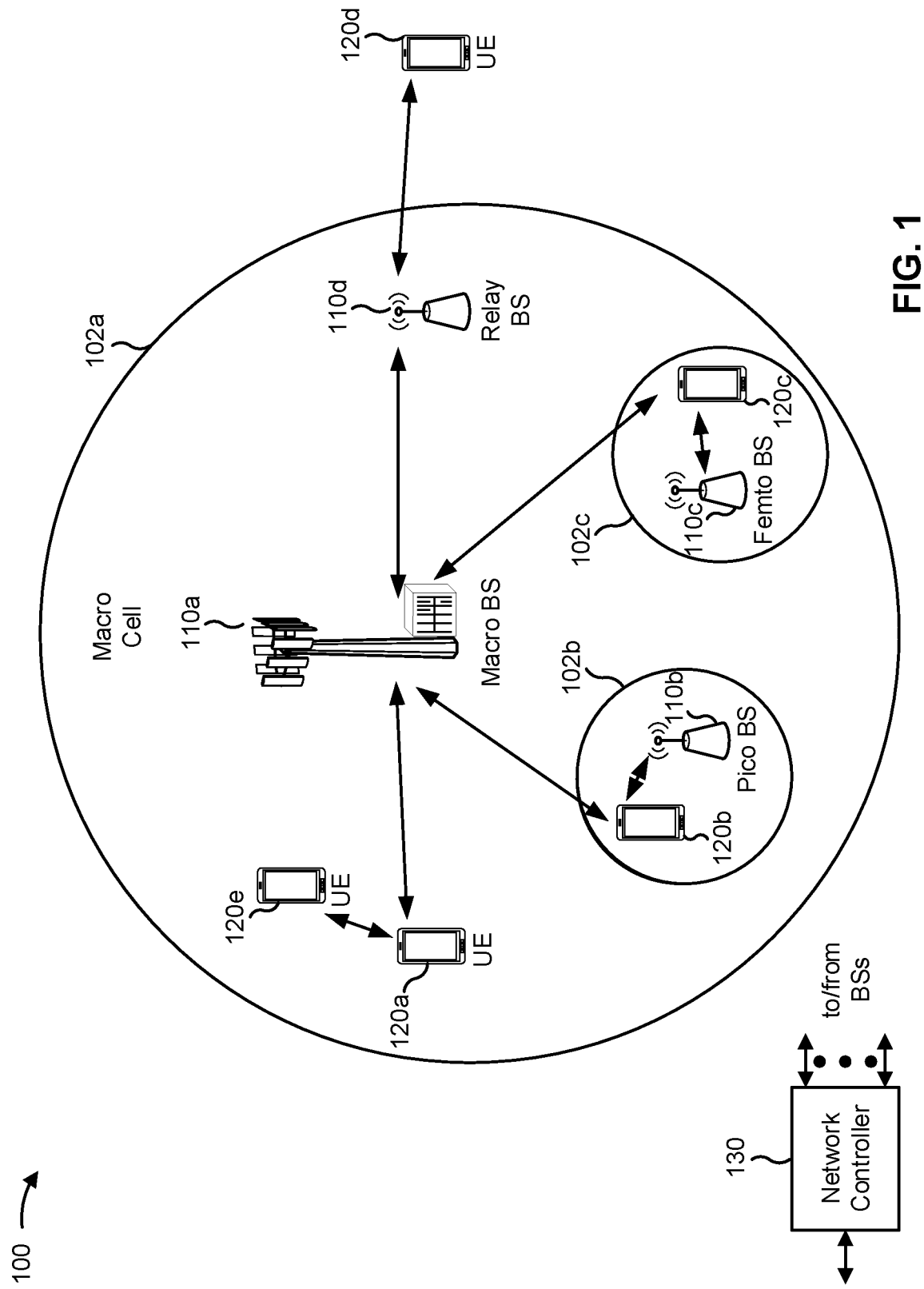
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements" or "features"). These elements may be implemented using hardware, software, or combinations thereof. Whether such elements are implemented as hardware or software depends upon the particular application and design constraints imposed on the overall system.

While some aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, RF-chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular area (e.g., a fixed or changing geographical area). In some scenarios, BSs 110 may be stationary or non-stationary. In some non-stationary scenarios, mobile BSs 110 may move with varying speeds, direction, and/or heights. In 3GPP, the term "cell" can refer to a coverage area of a BS 110 and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. Additionally, or alternatively, a BS may support access to an unlicensed RF band (e.g., a Wi-Fi band and/or the like). A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network. In other scenarios, BSs may be implemented in a software defined network (SDN) manner or via network function virtualization (NFV) manner.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*, 120*d*, 120*e*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, robotics, drones, implantable devices, augmented reality devices, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like. These components may be integrated in a variety of combinations and/or may be stand-alone, distributed components considering design constraints and/or operational preferences.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110. A UE performing scheduling operations can include or perform base-station-like functions in these deployment scenarios.

As indicated above, FIG. 1 is provided merely as an example. Other examples may differ from what is described with regard to FIG. 1.

Figure 2:
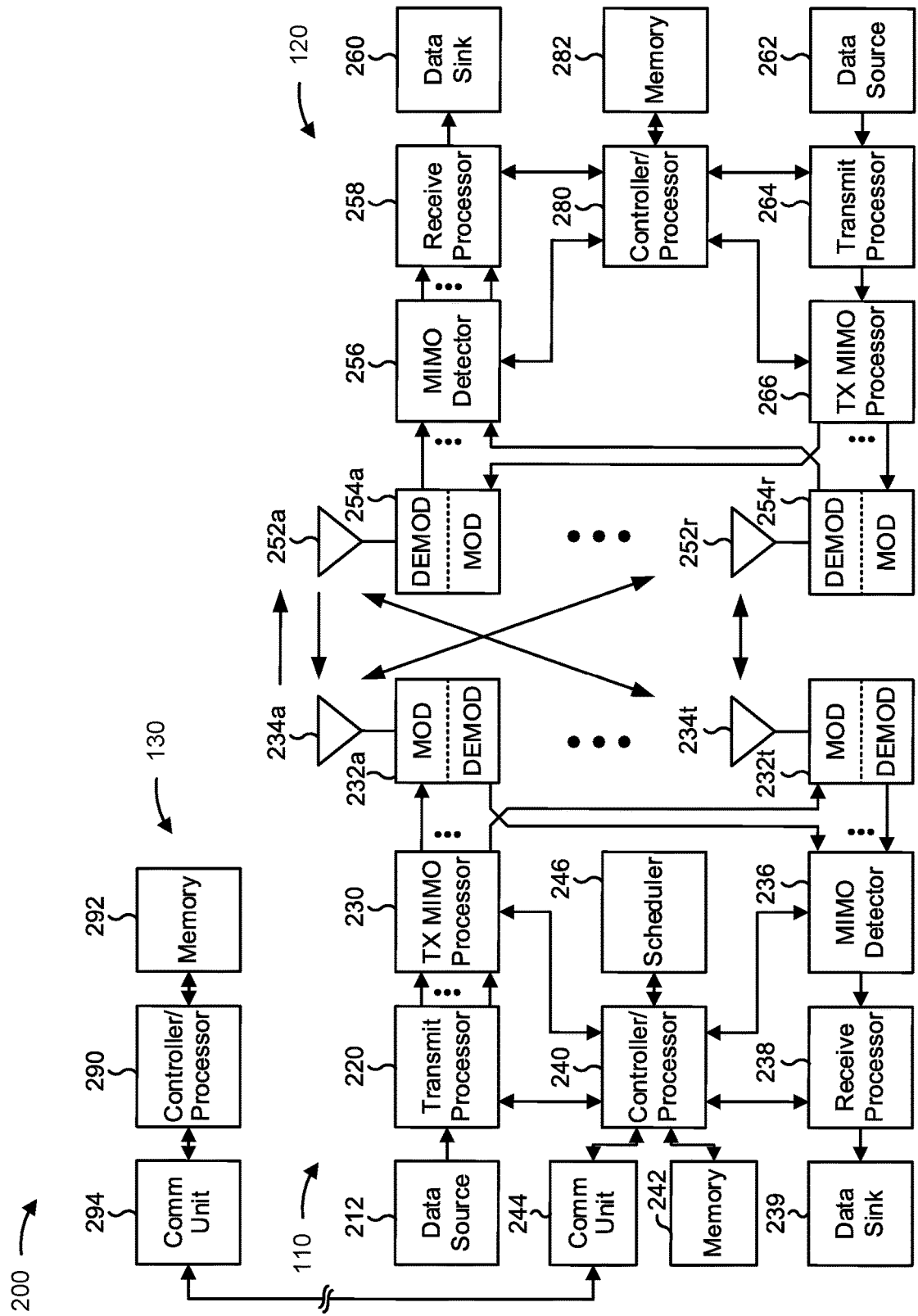
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1. The T and R antennas may be configured with multiple antenna elements formed in an array for MIMO or massive MIMO deployments that can occur in millimeter wave (mmWave or mmW) communication systems.

At base station 110, a transmit processor 220 can carry out a number of functions associated with communications. For example, transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive downlink RF signals. The downlink RF signals may be received from and/or may be transmitted by one or more base stations 110. The signals can be provided to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

For uplink communications, a UE 120 may transmit control information and/or data to another device, such as one or more base stations 110. For example, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with code block reordering for retransmissions, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. A scheduler 246 may schedule UEs for data transmission on the downlink and/or uplink.

In some aspects, a transmitter device (e.g., the UE 120 or the BS 110) may include a variety of means or components for implementing communication functions. For example, the variety of means may include means for transmitting a hybrid automatic repeat request (HARQ) communication using a first code block order for code blocks of the HARQ communication, means for detecting a trigger to retransmit the HARQ communication based at least in part on transmitting the HARQ communication, means for reordering the code blocks of the HARQ communication based at least in part on detecting the trigger to retransmit the HARQ communication, means for retransmitting the HARQ communication using a second code block order based at least in part on reordering the code blocks of the HARQ communication, and/or the like.

In some aspects, the UE 120 may include a variety of structural components for carrying out functions of the various means. For example, structural components that carry out functions of such means may include one or more components of UE 120 described in connection with FIG. 2, such as antenna 252, DEMOD 254, MOD 254, MIMO detector 256, receive processor 258, transmit processor 264, TX MIMO processor 266, controller/processor 280, and/or the like.

In some aspects, the base station 110 may include a variety of structural components for carrying out functions of the various means. For example, structural components that carry out functions of such means may include one or more components of base station 110 described in connection with FIG. 2, such as transmit processor 220, TX MIMO processor 230, DEMOD 232, MOD 232, antenna 234, MIMO detector 236, receive processor 238, controller/processor 240, and/or the like.

As indicated above, FIG. 2 is provided merely as an example. Other examples may differ from what is described with regard to FIG. 2.

Figure 3A:
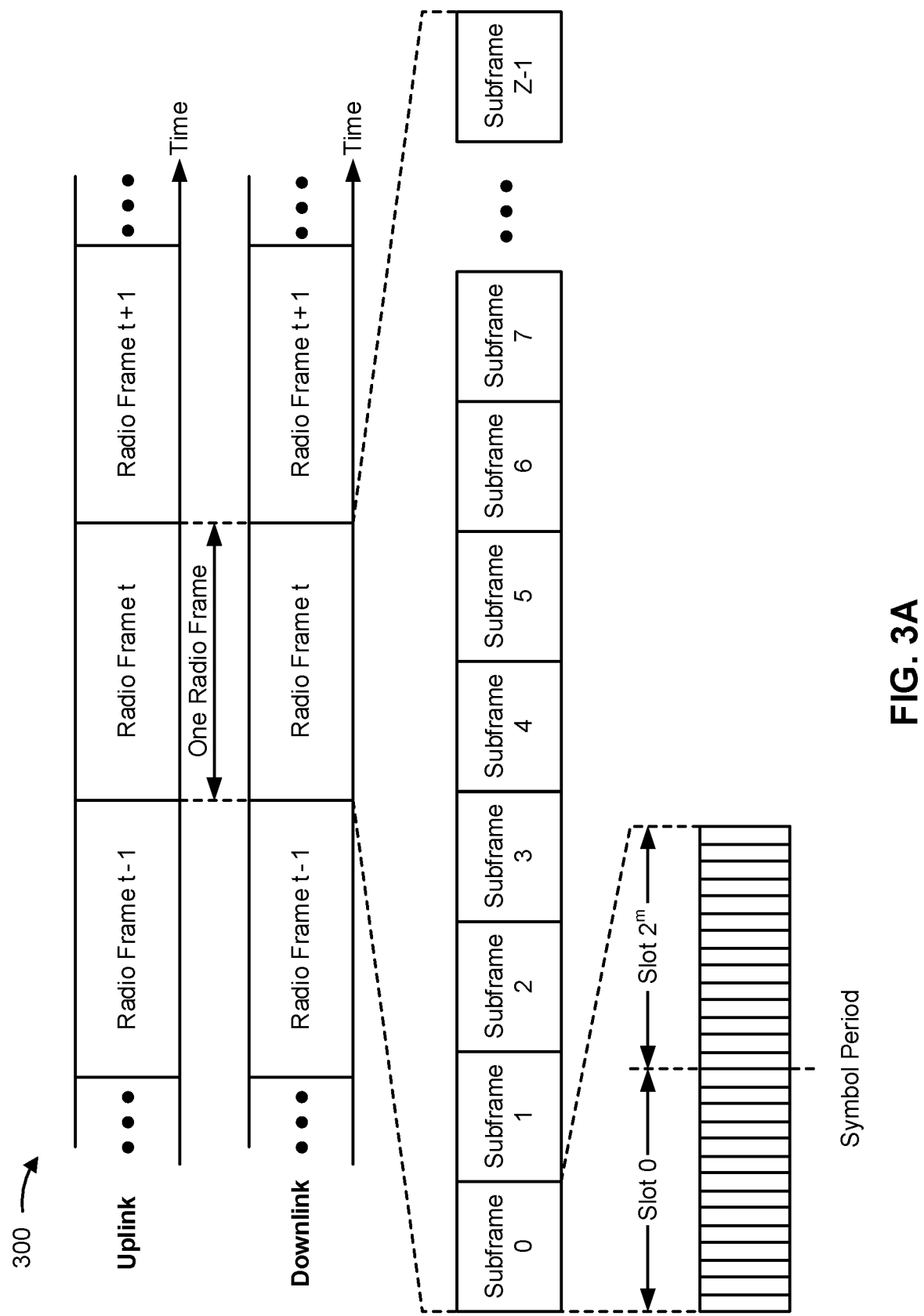
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
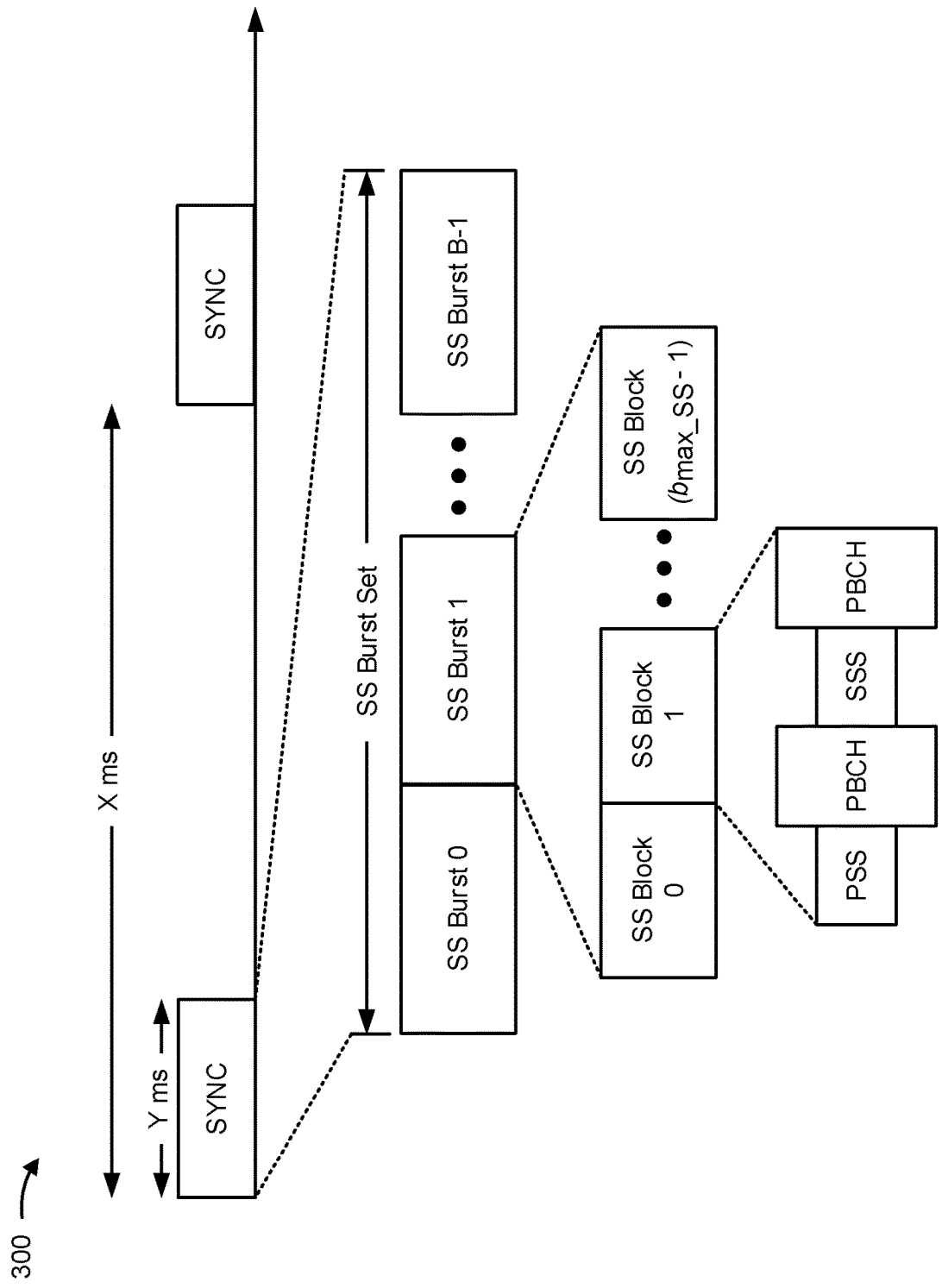
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
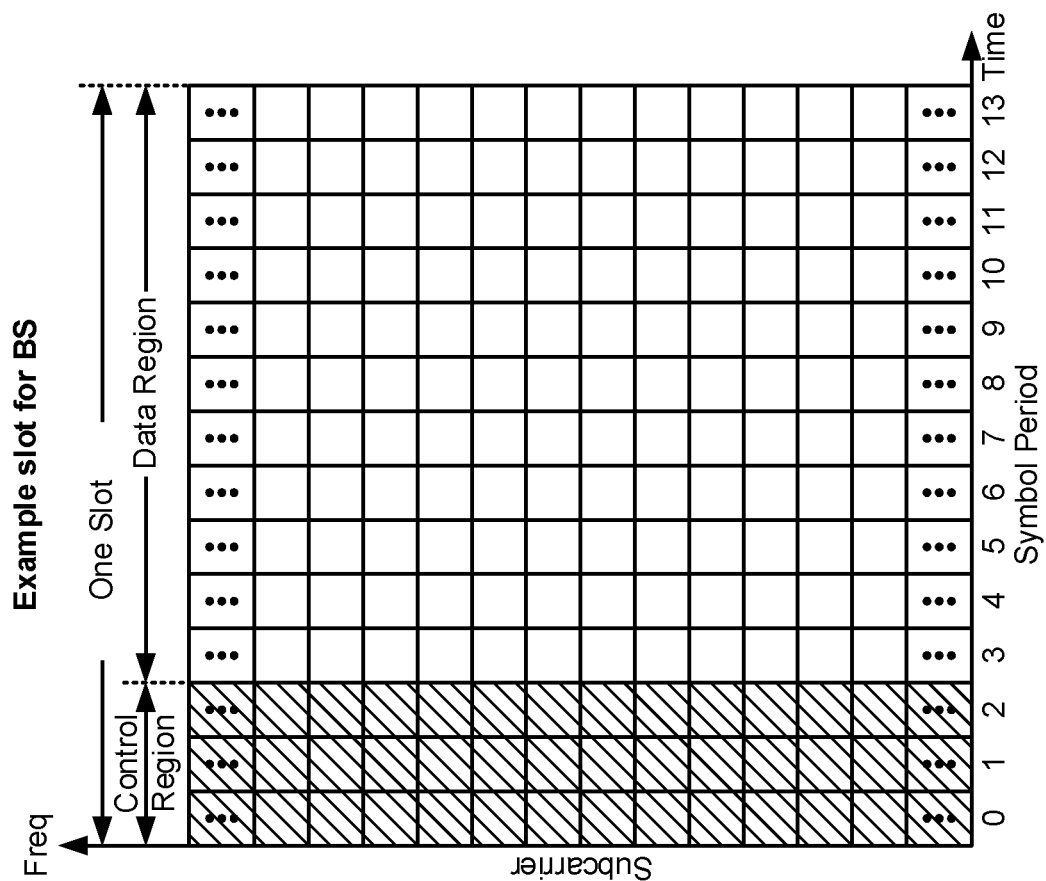
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
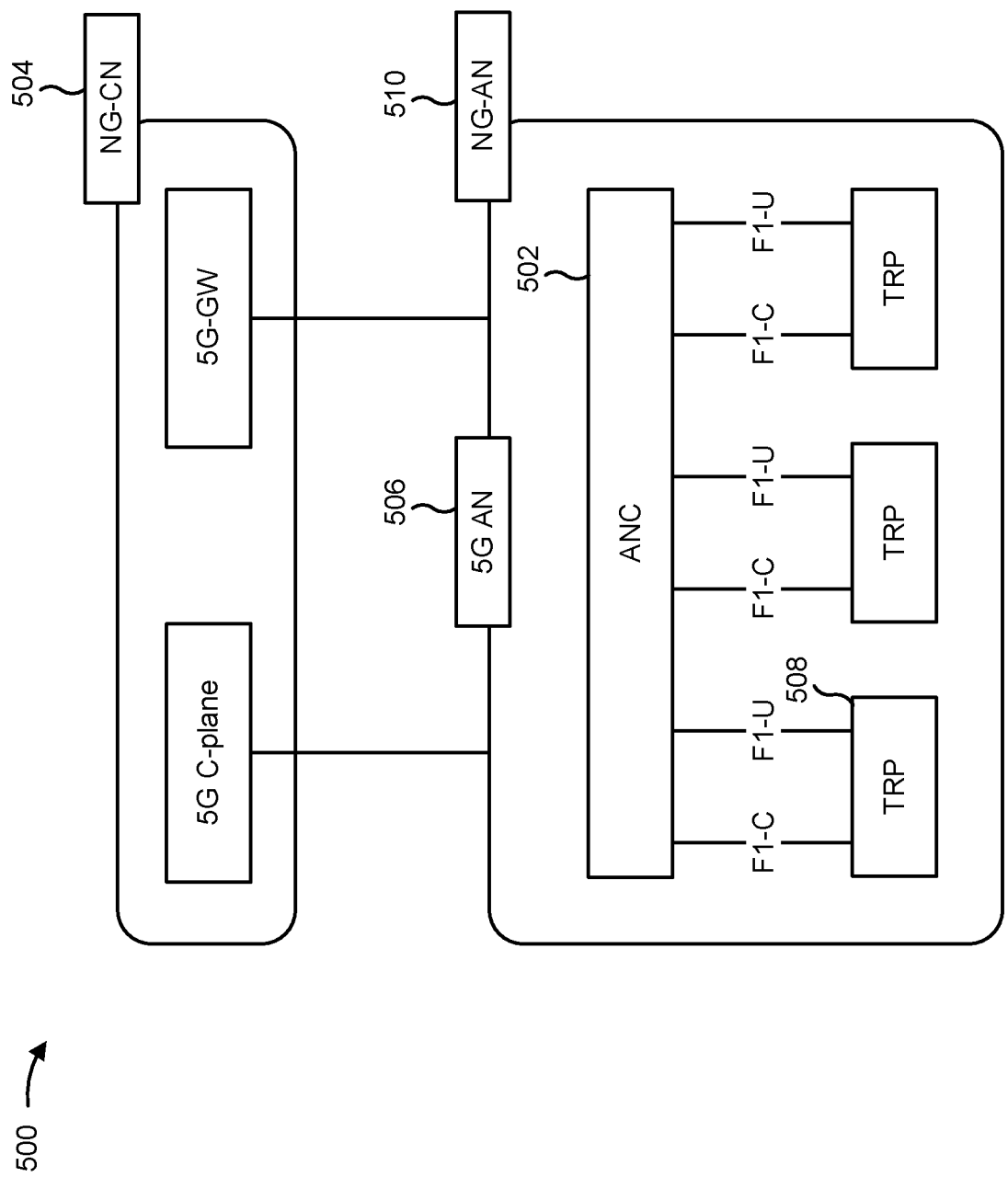
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), medium access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
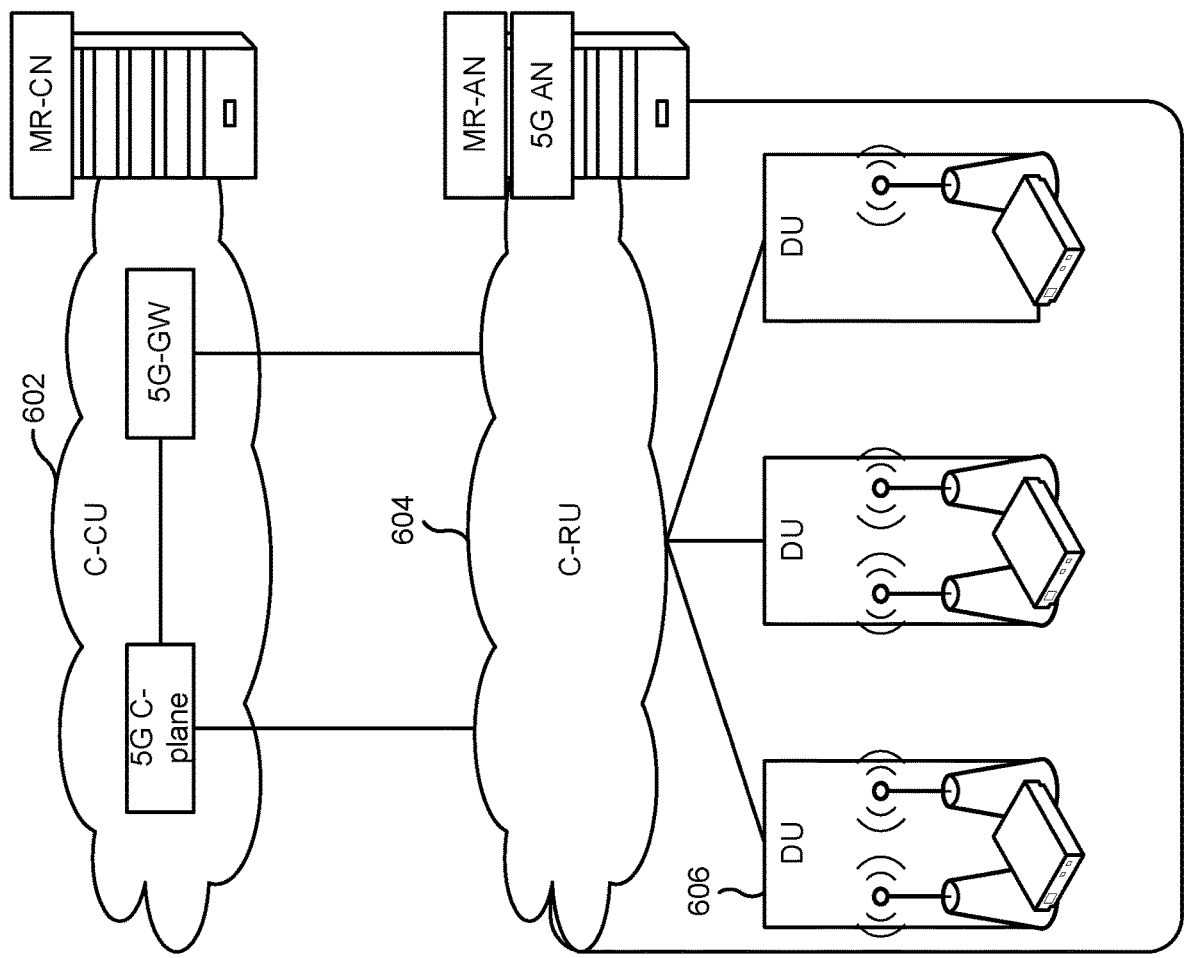
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

Figure 7:
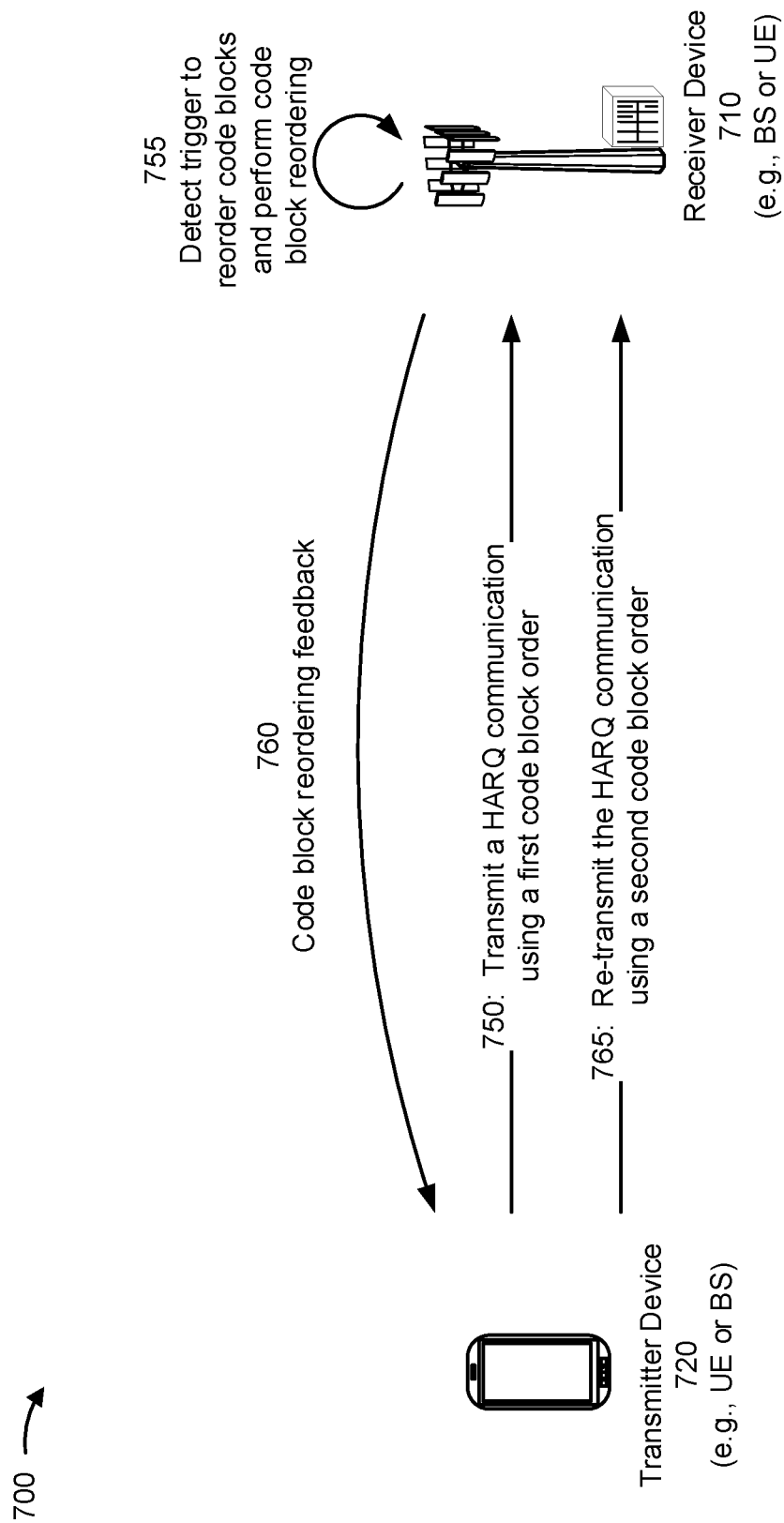
FIG. 7 is a diagram illustrating an example of code block reordering for retransmissions, in accordance with various aspects of the present disclosure.

FIG. 7 is a diagram illustrating an example 700 of code block reordering for retransmissions, in accordance with various aspects of the present disclosure.

As shown in FIG. 7, example 700 includes a receiver device 710 (e.g., a BS 110 or a UE 120) and a transmitter device 720 (e.g., a UE 120 or a BS 110). Although some aspects are described and/or depicted herein in terms of a UE transmitting to a BS, other configurations are possible such as a BS transmitting to a UE, a UE transmitting to a UE, a BS transmitting to a BS, or any other type of transmitter device transmitting to any other type of receiver device. Moreover, although some aspects are described in terms of a transmitter device and a receiver device, each of the transmitter device and the receiver device may transmit, receive, and/or perform any other wireless communication function.

As further shown in FIG. 7, and by reference number 750, transmitter device 720 may transmit a HARQ communication using a first code block order. For example, transmitter device 720 may transmit a set of code blocks of the HARQ communication in a first order and/or arrangement with respect to time resources, frequency resources, and/or the like of symbols in a slot.

As further shown in FIG. 7, and by reference numbers 755 and 760, receiver device 710 may detect a trigger to reorder code blocks and may provide code block reordering feedback to transmitter device 720. For example, when receiver device 710 is a controller of communication with transmitter device 720, receiver device 710 may detect a spur, a threshold level of periodic interference, a threshold edge effect, a threshold residual frequency error, and/or the like. Additionally, or alternatively, receiver device 710 may detect low signal quality with code blocks of a particular symbol (e.g., low signal quality for code blocks of a first symbol relative to code blocks of one or more subsequent symbols, as described above). In some aspects, transmitter device 720 may detect a trigger to reorder code blocks based on receiving the feedback. For example, transmitter device 720 may detect a spur based on feedback identifying the spur and may perform code block reordering to mitigate the spur.

In some aspects, transmitter device 720 may receive a request to perform code block reordering. For example, when transmitter device 720 is a controller of communication with receiver device 710, receiver device 710 may detect a spur, a threshold level of periodic interference, and/or the like and may indicate to transmitter device 720 a request that transmitter device 720 is to reorder code blocks for a retransmission of the HARQ communication. In some aspects, receiver device 710 may transmit feedback information to transmitter device 720 to enable transmitter device 720 to determine that an issue exists with transmission (e.g., a spur exists).

In some aspects, receiver device 710 may transmit a recommendation regarding a reordering type for code block reordering (e.g., frequency biased reordering or time biased reordering). Additionally, or alternatively, transmitter device 720 may use information, such as information relating to a cyclic redundancy check (CRC) bitmap to determine a code block reordering type. In some aspects, transmitter device 720 may receive feedback, from the receiver device, that may indicate a type of reordering to perform, In some aspects, transmitter device 720 may reorder all of the code blocks when performing code block reordering. For example, transmitter device 720 may ensure that each code block is at a different time and/or frequency position in a retransmission of the HARQ communication relative to in the transmission of the HARQ communication. Additionally, or alternatively, transmitter device 720 may reorder a subset of code blocks when performing code block reordering. For example, transmitter device 720 may change a time and/or frequency position of code blocks in a symbol that experiences interference from an aggressor transmitter device. In this case, transmitter device 720 may maintain the time and/or frequency position of one or more other code blocks.

In some aspects, transmitter device 720 may reorder code blocks of the HARQ communication based at least in part on a reordering function. For example, transmitter device 720 may reorder the code blocks based at least in part on an index of a retransmission of the HARQ communication, such that a transmission of the HARQ communication is performed with a first code block order, a first retransmission is performed with a second code block order, a third retransmission is performed with a third code block order, and/or the like. Additionally, or alternatively, transmitter device 720 may reorder code blocks based at least in part on a cell identifier of a cell in which transmitter device 720 is operation. Additionally, or alternatively, transmitter device 720 may reorder code blocks based at least in part on a device identifier (e.g., a UE identifier of transmitter device 720 or receiver device 710, a BS identifier of transmitter device 720 or receiver device 710, and/or the like).

Additionally, or alternatively, transmitter device 720 may reorder code blocks based at least in part on a randomization function. For example, transmitter device 720 may apply a pseudo-random permutation to the first code block order to determine a second code block order for a retransmission of the HARQ communication. Similarly, transmitter device 720 may apply a cyclic shift in frequency, a time shift, and/or the like to the first code block order to determine the second code block order. In some aspects, transmitter device 720 may apply a mirroring function to determine the second code block order. For example, transmitter device 720 may mirror time locations of code blocks, such that code blocks of a last symbol in the first code block order are in a first symbol of the second code block order.

In some aspects, transmitter device 720 may signal the second code block order. For example, transmitter device 720 may transmit a downlink control information (DCI) communication identifying the second code block order. In some aspects, transmitter device 720 may select from a set of possible code block orders or code block order reordering functions (e.g., cell identifier-based reordering, UE identifier-based reordering, retransmission index-based reordering, and/or the like) and signal the selection. For example, transmitter device 720 may be configured with a plurality of possible code block orders and may set one or more bits in the DCI to indicate which code block order is selected. In this case, receiver device 710 may be configured with information identifying the plurality of possible code block orders and may select the second code block order based at least in part on the one or more bits in the DCI.

As further shown in FIG. 7, and by reference number 765, transmitter device 720 may retransmit the HARQ communication using the second code block order. For example, transmitter device 720 may retransmit the HARQ communication to receiver device 710. In this case, by using the second code block order, transmitter device 720 may achieve an increased average processing gain for the HARQ communication. Additionally, or alternatively, transmitter device 720 may transmit one or more subsequent retransmissions of the HARQ communication (e.g., using a third code block, a fourth code block order, and/or the like) to receiver device 710, thereby further increasing average processing gain.

In this way, transmitter device 720 improves HARQ feedback by reducing a likelihood of dropped communications. For example, transmitter device 720 improves HARQ feedback in a single DMRS scenario where frequency error may occur. Additionally, or alternatively, transmitter device 720 improves HARQ feedback in a multi-UE interference scenario where each UE has the same allocation causing interference with each other UE. Additionally, or alternatively, transmitter device 720 improves HARQ feedback in low mobility scenarios, spur scenarios, slot ramp up or down scenarios, other types of scenarios, and/or the like, as described in more detail above.

As indicated above, FIG. 7 is provided as an example. Other examples may differ from what is described with respect to FIG. 7.

Figure 8:
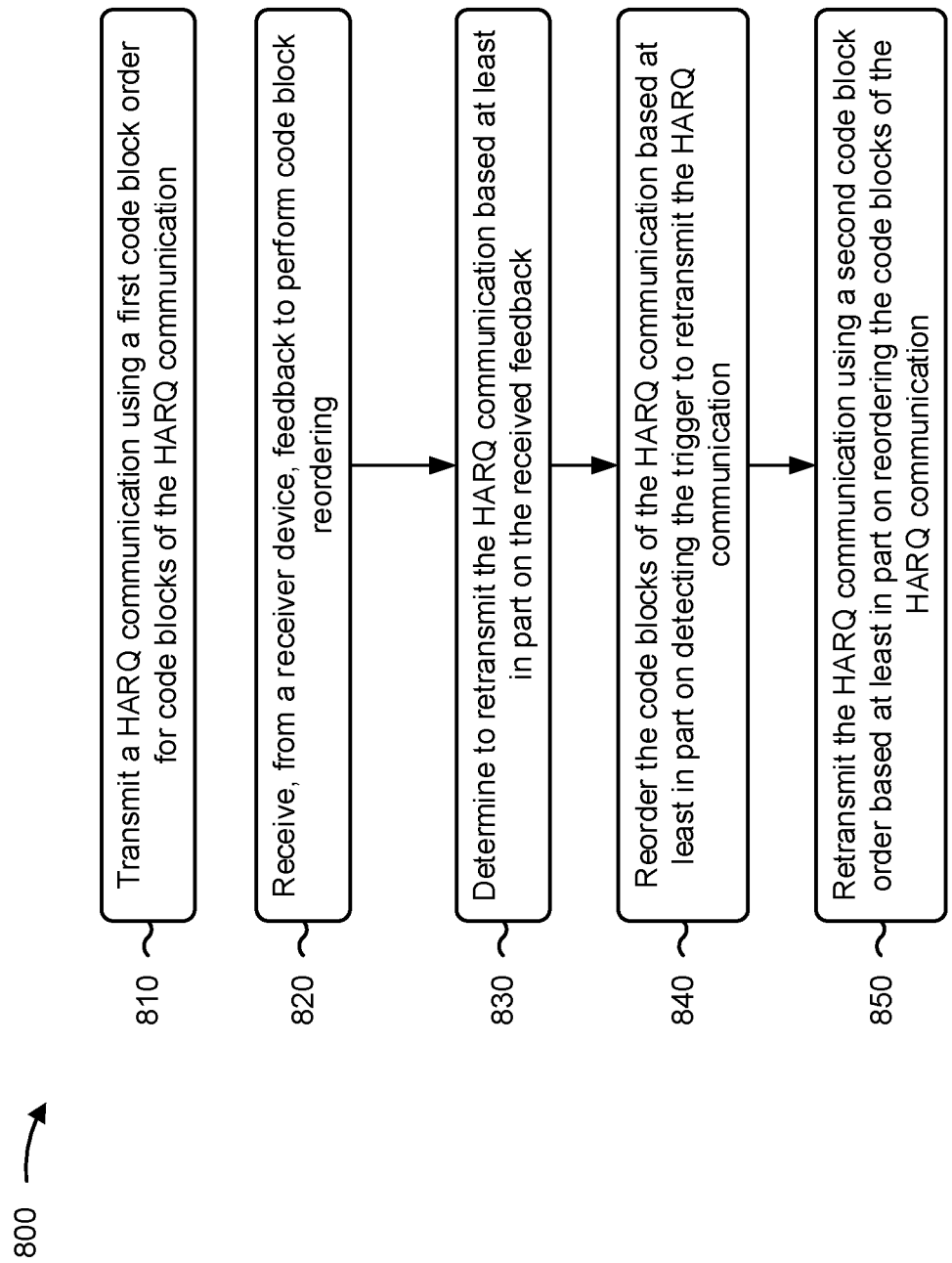
FIG. 8 is a diagram illustrating an example process performed, for example, by a transmitter device, in accordance with various aspects of the present disclosure.

FIG. 8 is a diagram illustrating an example process 800 performed, for example, by a transmitter device, in accordance with various aspects of the present disclosure. Example process 800 is an example where the transmitter device (e.g., BS 110, UE 120, transmitter device 720, and/or the like) performs operations associated with code block reordering for retransmissions.

As shown in FIG. 8, in some aspects, process 800 may include transmitting a HARQ communication using a first code block order for code blocks of the HARQ communication (block 810). For example, the transmitter device (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit a HARQ communication using a first code block order for code blocks of the HARQ communication, as described above.

As further shown in FIG. 8, in some aspects, process 800 may include receiving, from a receiver device, feedback to perform code block reordering (block 820). For example, the transmitter device (e.g., using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, and/or the like) may receive, from a receiver device, feedback to perform code block reordering, as described above.

As further shown in FIG. 8, in some aspects, process 800 may include determining to retransmit the HARQ communication based at least in part on the received feedback (block 830). For example, the transmitter device (e.g., using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, and/or the like) may determine to retransmit the HARQ communication based at least in part on the received feedback, as described above.

As further shown in FIG. 8, in some aspects, process 800 may include reordering the code blocks of the HARQ communication based at least in part on detecting the trigger to retransmit the HARQ communication (block 840). For example, the transmitter device (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may reorder the code blocks of the HARQ communication based at least in part on detecting the trigger to retransmit the HARQ communication, as described above.

As further shown in FIG. 8, in some aspects, process 800 may include retransmitting the HARQ communication using a second code block order based at least in part on reordering the code blocks of the HARQ communication (block 850). For example, the transmitter device (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may retransmit the HARQ communication using a second code block order based at least in part on reordering the code blocks of the HARQ communication, as described above.

Process 800 may include additional aspects, such as any single aspect or any combination of aspects described below and/or in connection with one or more other processes described elsewhere herein.

In a first aspect, a code block order of the HARQ communication is based at least in part on a transmission index of the HARQ communication.

In a second aspect, alone or in combination with the first aspect, process 800 includes retransmitting the HARQ communication using a third code block order after retransmitting the HARQ communication using the second code block order.

In a third aspect, alone or in combination with one or more of the first and second aspects, process 800 includes transmitting at least one downlink control information to indicate at least one code block order for the HARQ communication.

In a fourth aspect, alone or in combination with one or more of the first through third aspects, a code block order of the HARQ communication is based at least in part on a cell identifier or a user identifier.

In a fifth aspect, alone or in combination with one or more of the first through fourth aspects, reordering the code blocks includes applying at least one of a pseudo-random permutation, a cyclic shift in frequency, a time shift, or a combination thereof.

In a sixth aspect, alone or in combination with one or more of the first through fifth aspects, retransmitting the HARQ communication includes retransmitting the HARQ communication using a mirrored time resource in a slot relative to a time resource of a previous transmission of the HARQ communication.

In a seventh aspect, alone or in combination with one or more of the first through sixth aspects, process 800 selecting a code block reordering technique based at least in part on the received feedback.

In an eighth aspect, alone or in combination with one or more of the first through seventh aspects, process 800 may include determining to perform code block reordering based at least in part on received feedback from a receiver device.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a transmitter device, comprising:
   transmitting a hybrid automatic repeat request (HARQ) communication using a first code block order for a plurality of code blocks of the HARQ communication;
   receiving, from a receiver device, feedback to perform code block reordering;
   reordering at least a subset of the plurality of the code blocks of the HARQ communication to determine a second code block order based at least in part on detecting a trigger to retransmit the HARQ communication based at least in part on the received feedback,
      wherein the second code block order is based at least in part on a retransmission index associated with a randomization function and a number of retransmissions of the HARQ communication, and
      wherein the second code block order changes a first time and/or frequency position of one or more code blocks of the first code block order and maintains a second time and/or frequency position of one or more other code blocks of the first code block order; and
   retransmitting the HARQ communication using the second code block order.

2. The method of claim 1, further comprising:
   retransmitting the HARQ communication using a third code block order after retransmitting the HARQ communication using the second code block order.

3. The method of claim 1, further comprising:
   transmitting at least one downlink control information to indicate at least one code block order for a retransmission of the HARQ communication.

4. The method of claim 1, wherein the second code block order is further based at least in part on a user identifier.

5. The method of claim 1, wherein reordering the plurality of code blocks comprises:
   applying at least one of:
      a pseudo-random permutation,
      a cyclic shift in frequency,
      a time shift, or
      a combination thereof.

6. The method of claim 5, further comprising:
   selecting a code block reordering technique based at least in part on the received feedback,
      wherein reordering the plurality of code blocks is further based at least in part on selecting the code block reordering technique.

7. The method of claim 1, wherein reordering the plurality of code blocks is further based at least in part on a mirrored time resource in a slot relative to a time resource of a previous transmission of the HARQ communication.

8. The method of claim 1, wherein the second code block order is further based at least in part on a cell identifier.

9. A transmitter device for wireless communication, comprising:
   a memory; and
   one or more processors coupled to the memory, the one or more processors configured to:
      transmit a hybrid automatic repeat request (HARQ) communication using a first code block order for a plurality of code blocks of the HARQ communication;
      receive, from a receiver device, feedback to perform code block reordering;
      reorder at least a subset of the plurality of code blocks of the HARQ communication to determine a second code block order based at least in part on detecting a trigger to retransmit the HARQ communication based on the received feedback,
         wherein the second code block order is based at least in part on a retransmission index associated with a randomization function and a number of retransmissions of the HARQ communication, and
         wherein the second code block order changes a first time and/or frequency position of one or more code blocks of the first code block order and maintains a second time and/or frequency position of one or more other code blocks of the first code block; and
      retransmit the HARQ communication using the second code block order.

10. The transmitter device of claim 9, wherein the one or more processors are further configured to:
    retransmit the HARQ communication using a third code block order after retransmitting the HARQ communication using the second code block order.

11. The transmitter device of claim 9, wherein the one or more processors are further configured to:
    transmit at least one downlink control information to indicate at least one code block order for a retransmission of the HARQ communication.

12. The transmitter device of claim 9, wherein the second code block order is further based at least in part on a user identifier.

13. The transmitter device of claim 9, wherein the one or more processors, when reordering the plurality of code blocks, are to:
    apply at least one of:
       a pseudo-random permutation,
       a cyclic shift in frequency,
       a time shift, or
       a combination thereof.

14. The transmitter device of claim 13, wherein the one or more processors are further configured to:
    select a code block reordering technique based at least in part on the received feedback,
       wherein reordering the plurality of code blocks is further based at least in part on selecting the code block reordering technique.

15. The transmitter device of claim 9, wherein reordering the plurality of code blocks is further based at least in part on a mirrored time resource in a slot relative to a time resource of a previous transmission of the HARQ communication.

16. The transmitter device of claim 9, wherein the second code block order is further based at least in part on a cell identifier.

17. A non-transitory computer-readable medium storing one or more instructions for wireless communication, the one or more instructions comprising:
one or more instructions that, when executed by one or more processors of a transmitter device, cause the one or more processors to:
transmit a hybrid automatic repeat request (HARQ) communication using a first code block order for a plurality of code blocks of the HARQ communication;
receive, from a receiver device, feedback to perform code block reordering;
reorder at least a subset of the plurality of code blocks of the HARQ communication to determine a second code block order based at least in part on detecting a trigger to retransmit the HARQ communication based at least in part on the received feedback,
wherein the second code block order is based at least in part on a retransmission index associated with a randomization function and a number of retransmissions of the HARQ communication, and
wherein the second code block order changes a first time and/or frequency position of one or more code blocks of the first code block order and maintains a second time and/or frequency position of one or more other code blocks of the first code block order; and
retransmit the HARQ communication using the second code block order.

18. The non-transitory computer-readable medium of claim 17, wherein the one or more instructions, when executed by the one or more processors, further cause the one or more processors to:
retransmit the HARQ communication using a third code block order after retransmitting the HARQ communication using the second code block order.

19. The non-transitory computer-readable medium of claim 17, wherein the one or more instructions, when executed by the one or more processors, further cause the one or more processors to:
transmit at least one downlink control information to indicate at least one code block order for a retransmission of the HARQ communication.

20. The non-transitory computer-readable medium of claim 17, wherein the second code block order is further based at least in part on a user identifier.

21. The non-transitory computer-readable medium of claim 17, wherein the one or more instructions, that cause the one or more processors to reorder the plurality of code blocks, cause the one or more processors to:
apply at least one of:
a pseudo-random permutation,
a cyclic shift in frequency,
a time shift, or
a combination thereof.

22. The non-transitory computer-readable medium of claim 21, wherein the one or more instructions, when executed by the one or more processors, further cause the one or more processors to:
select a code block reordering technique based at least in part on the received feedback,
wherein reordering the plurality of code blocks is further based at least in part on selecting the code block reordering technique.

23. The non-transitory computer-readable medium of claim 17, wherein the one or more instructions, that cause the one or more processors to retransmit the HARQ communication, causes the one or more processors to:
retransmit the HARQ communication using a mirrored time resource in a slot relative to a time resource of a previous transmission of the HARQ communication.

24. The non-transitory computer-readable medium of claim 17, wherein the second code block order is further based at least in part on a cell identifier.

25. An apparatus for wireless communication, comprising:
means for transmitting a hybrid automatic repeat request (HARQ) communication using a first code block order for a plurality of code blocks of the HARQ communication;
means for receiving, from a receiver device, feedback to perform code block reordering;
means for reordering at least subset of the plurality of code blocks of the HARQ communication to determine a second code block order based at least in part on detecting a trigger to retransmit the HARQ communication based at least in part on the received feedback,
wherein the second code block order is based at least in part on a retransmission index associated with a randomization function and a number of retransmissions of the HARQ communication, and
wherein the second code block order changes a first time and/or frequency position of one or more code blocks of the first code block order and maintains a second time and/or frequency position of one or more other code blocks of the first code block; and
means for retransmitting the HARQ communication using the second code block order.

26. The apparatus of claim 25, further comprising:
means for retransmitting the HARQ communication using a third code block order after retransmitting the HARQ communication using the second code block order.

27. The apparatus of claim 25, further comprising:
means for transmitting at least one downlink control information to indicate at least one code block order for a retransmission of the HARQ communication.

28. The apparatus of claim 25, wherein the second code block order is further based at least in part on a user identifier.

29. The apparatus of claim 25, wherein the means for reordering the plurality of code blocks comprises:
means for applying at least one of:
a pseudo-random permutation,
a cyclic shift in frequency,
a time shift, or
a combination thereof.

30. The apparatus of claim 25, wherein the second code block order is further based at least in part on a cell identifier.

* * * * *